United States Patent [19]
Takatori et al.

[11] Patent Number: 5,473,598
[45] Date of Patent: Dec. 5, 1995

[54] ROUTING METHOD AND APPARATUS FOR SWITCHING BETWEEN ROUTING AND CONVERSION TABLES BASED ON SELECTION INFORMATION INCLUDED IN CELLS TO BE ROUTED

[75] Inventors: Masahiro Takatori, Kokubunji; Yukio Nakano, Hachioji; Yoshihiro Ashi; Tadayuki Kanno, both of Yokohama, all of Japan

[73] Assignee: Hitachi, Ltd., Tokyo, Japan

[21] Appl. No.: 744,513

[22] Filed: Aug. 13, 1991

[30] Foreign Application Priority Data

Aug. 17, 1990 [JP] Japan ................... 2-215710

[51] Int. Cl.6 ............................................ H04J 3/26
[52] U.S. Cl. ........................................ 370/16; 370/60.1
[58] Field of Search ........................... 370/60, 60.1, 61, 370/94.1, 13, 14, 58.1–58.3, 16, 85.13, 85.14, 94.2; 340/825.52

[56] References Cited

U.S. PATENT DOCUMENTS

| | | | |
|---|---|---|---|
| 4,837,761 | 6/1989 | Isono et al. | 370/60 |
| 4,920,531 | 4/1990 | Isono et al. | 370/60 |
| 5,027,350 | 6/1991 | Marshall | 370/85.13 |
| 5,072,440 | 12/1991 | Isono et al. | 370/60 |
| 5,079,762 | 1/1992 | Tanabe | 370/60 |
| 5,084,867 | 1/1992 | Tachibama et al. | 370/16 |
| 5,101,404 | 3/1992 | Kunimoto et al. | 370/60 |
| 5,301,184 | 4/1994 | Uriu et al. | 370/16 |

Primary Examiner—Douglas W. Olms
Assistant Examiner—Chau T. Nguyen
Attorney, Agent, or Firm—Antonelli, Terry, Stout & Kraus

[57] ABSTRACT

A cell routing method and apparatus in an ATM processing apparatus. The ATM processing apparatus has two or more routing tables associated with address filters of an ATM switch to store routing information for indicating the destination of cell output, and two or more conversion tables associated with VPI conversion circuits for replacing VPI (Virtual Path Identifier) or VCI conversion circuits for replacing VCI (Virtual Channel Identifier) to store information for indicating the VPI or VCI obtained after conversion. In an input interface circuit, selection information indicating which routing table and conversion table out of the above described two or more routing tables and two or more conversion tables should be selected is written into an occupied area within a cell. In a switch circuit, the selection information is read and one routing table is selected out of the above described two or more routing tables on the basis of the selection information thus read, and cell routing is thus performed based on information in the selected routing table. Further, in an output interface circuit, selection information contained in the cell is read and one conversion table is selected out of the above described two or more conversion tables on the basis of the selection information thus read, and VPI conversion or VCI conversion is thus executed based on information in the selected conversion table.

16 Claims, 2 Drawing Sheets

ROUTING METHOD AND APPARATUS FOR SWITCHING BETWEEN ROUTING AND CONVERSION TABLES BASED ON SELECTION INFORMATION INCLUDED IN CELLS TO BE ROUTED

BACKGROUND OF THE INVENTION

The present invention relates to an ATM (Asynchronous Transfer Mode) transmission apparatus and its exchange, and in particular to a cell routing method and apparatus. The ATM described in the present application conforms to CCITT Recommendation I. 361.

In a duplex system established at the present time as a fault tolerance technique, routine table rewriting is performed by preparing two routing tables, i.e., an active routing table and a stand-by routing table and by switching the active table over to the stand-by table in response to a signal fed from a control unit.

In routing table rewriting in an ATM switch, a VPI (Virtual Path Identifier) conversion table or a VCI (Virtual Channel Identifier) conversion table must also be rewritten. However, it is practically impossible to simultaneously execute information rewriting upon these two tables. Therefore, there is a possibility that cell routing is performed transitionally while tables before and after the rewriting are mixedly present. That is to say, individual cells are stored in cell buffers dispersedly disposed in various locations and those cells are outputted to succeeding stages after time delays. Therefore, it is impossible to execute the table selection switching throughout the apparatus by means of external control as in the prior art. Because time delays are typically statistical, and hence cell routing may be conducted in a state of noncoincidence between contents of a referred table and routing requests of individual cells. Since such a phenomenon results in transmission of unnecessary cells onto unexpected highways, it is desired to prevent such a phenomenon from the viewpoint of transmission quality improvement.

SUMMARY OF THE INVENTION

Accordingly, an object of the present invention is to perform switching of routing tables and a VPI conversion table or a VCI conversion table without causing interruption and without performing cell routing in a state of noncoincidence between contents of a referred table and routing requests of individual cells.

The above described object is attained by placing table selection information on individual cells at the interface of the input side to provide the cell itself with table selection function and by making, in an ATM switch, the selection of routing tables coincident with routing requests of individual cells.

In accordance with one aspect of the present invention for achieving the above described object, there are provided two or more routing tables relating to or associated with the address filter (hereafter referred to as AF) of the ATM switch and there are provided two or more conversion tables relating to or associated with the VPI conversion circuit or VCI conversion circuit. Typically, one routing table and one conversion table are selected out of the above described two or more routing tables and two or more conversion tables, and they are defined as active tables. A control unit sends a directive for selecting the active tables to input interface circuits. In each of the input interface circuits, a cell is modified in response to the directive so that the cell may contain table selection data. For example, in the stage succeeding a cell buffer (i.e., cell storage unit), selection information (active table selection) of the routing table and the conversion table is written into an unoccupied area within the cell. Or the selection information may be added to the cell.

In a switch circuit, table selection information (active table selection) within the cell is read, and routing is performed on the basis of the information of the active table.

In an output interface circuit, table selection information (active table selection) stored in the cell is read, and VPI conversion or VCI conversion is performed on the basis of information of the active table.

Processing performed when the routing table information and the conversion table information are altered will now be described.

The control unit selects one routing table and one conversion table other than the active tables out of the above described two or more routing tables and two or more conversion tables, and defines them as stand-by tables. The control unit then sends directives for rewriting stand-by tables to the switch circuit and the output interface circuit, and writes new information into the stand-by routing table and stand-by conversion table. The control unit then sends a directive for selecting the stand-by routing table and the stand-by conversion table to the input interface circuit. In the input interface circuit, a cell is so modified in the stage succeeding the cell buffer that the cell may contain table selection information. For example, table selection information (stand-by table selection) is written into an unoccupied area within the cell.

In the switch circuit, the table selection information (stand-by table selection) stored in the cell is read, and routing is performed on the basis of the information of the stand-by table.

In the output interface circuit, table selection information (stand-by table selection) stored in the cell is read, and VPI conversion or VCI conversion is performed on the basis of information of the stand-by table.

By the procedure heretofore described, the routing table and the conversion table are updated without causing interruption.

That is to say, by preparing two or more tables and rewriting the stand-by table while a certain table is being used as the active table, the problem of time difference of information rewriting is eliminated. Further, by storing table selection information within a cell, tables to be referred to can be administered for each cell, and noncoincidence between the routing information stored in the reference table and the routing request of an individual cell can be prevented.

DESCRIPTION OF THE PREFERRED EMBODIMENT

An embodiment of an ATM processing apparatus according to the present invention will now be described by referring to FIGS. 1 and 2.

Figure 1:
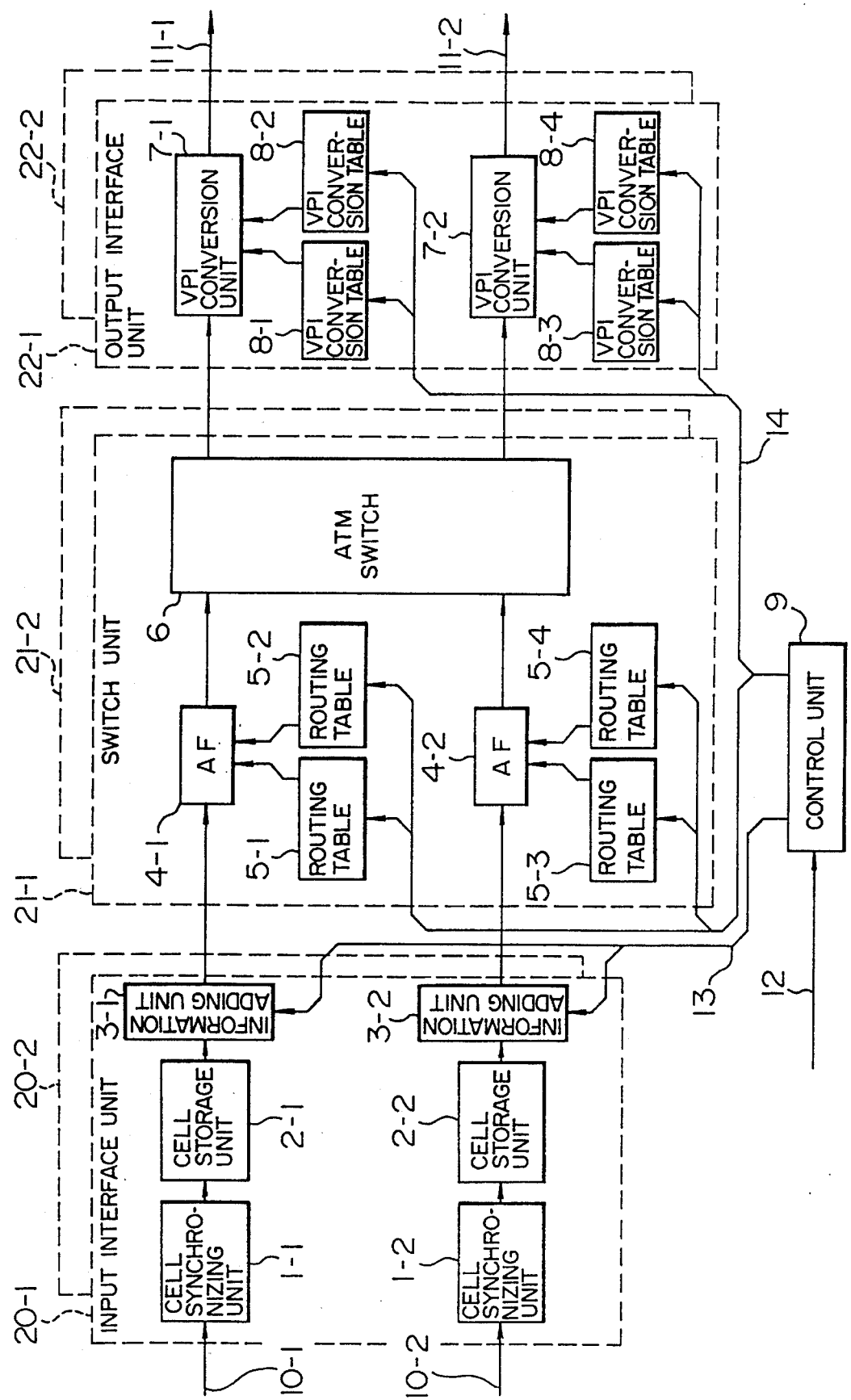
FIG. 1 is a diagram showing the configuration of an ATM processing apparatus which is an embodiment of the present invention.
Figure 2:
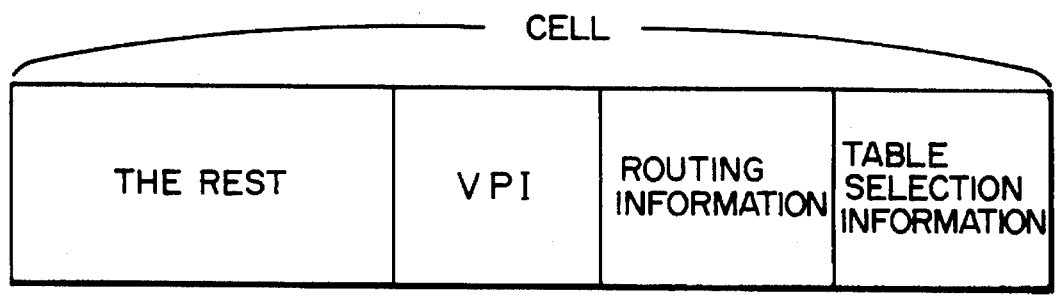
FIG. 2 is a diagram showing a cell format used in the ATM processing apparatus of FIG. 1.

With reference to FIG. 1, the ATM processing apparatus comprises cell synchronizing units 1—1 and 1-2 for performing synchronization with respect to inputted incoming cells, cell storage units 2-1 and 2—2, information adding units 3-1 and 3-2 for writing table selection information of the routing table and the VPI conversion table and routing information indicating the destination of cell output (i.e., output of an ATM switch) into the cell, address filters (hereafter referred to as AF) 4-1 and 4-2 for indicating the output destination of the incoming cells transmitted from input highways 10-1 and 10-2, routing tables 5-1, 5-2, 5-3 and 5-4 each storing different routing information referred to by the address filters, wherein the routing information stored in the routing table 5-1 does not always coincide with the routing information stored in the routing table 5-2 and, the routing information stored in the routing table 5-3 does not always coincide with the routing information stored in the routing table 5-4 an ATM switch 6 for switching cells inputted to input ports, VPI conversion units 7-1 and 7-2 for performing VPI conversion upon inputted cells, VPI conversion tables 8-1, 8-2, 8-3 and 8-4 each storing different VPI conversion information, and a control unit 9. Numerals 11-1 and 11-2 denote output highways for transmitting outgoing cells going out of an output interface. Numeral 12 denotes a table alteration instruction outputted from an operator or a control unit, which is not illustrated, to the control unit 9. Numeral 13 denotes a directive signal transmitted from the control unit 9 to the information adding units 3-1 and 3-2. Numeral 14 denotes a conversion table rewriting instruction signal and update information transmitted from the control unit 9 to the VPI conversion tables 8-1, 8-2, 8-3 and 8-4 and the routing tables 5-1, 5-2, 5-3 and 5-4.

The cell format used in the present embodiment will now be described by referring to FIG. 2. As shown in FIG. 2, a cell comprises a portion for storing table selection information, a routing information portion for indicating the destination of cell output (i.e., an output port of the ATM switch), a portion for indicating a VPI, and a portion for the rest.

Referring back to FIG. 1, operation of the present embodiment will now be described. The apparatus of the present embodiment has two routing tables relating to or associated with the AF of the ATM switch and two conversion tables relating to or associated with the VPI conversion circuit. Typically, one routing table and one VPI conversion table are selected out of the above described two routing tables and two VPI conversion tables, and the selected tables are defined as active tables. Referring to FIG. 1, the routing tables 5-1 and 5-3 and the VPI conversion tables 8-1 and 8-3 serve as active tables. The control unit 9 sends a directive for selecting the active tables to input interface units 20-1 and 20-2. In each of information adding units 3-1 and 3-2 respectively succeeding the cell storage units 2-1 and 2-2 respectively included in the input interface units 20-1 and 20-2, table selection information (active table selection) of the routing table and the VPI conversion table is written into an area so disposed within a cell as to store table selection information. Or the table selection information may be added to the cell.

In switch units 21-1 and 21-2, each of the AF 4-1 and 4-2 reads table selection information (active table selection) contained in the cell or added to the cell, and selects the active table on the basis of the selection information thus read. On the basis of information stored in the active tables 5-1 and 5-3, the ATM switch 6 performs routing.

In outpost interface units 22-1 and 22-2, each of the VPI conversion units 7-1 and 7-2 reads table selection information (active table selection) contained in the cell or added to the cell, selects the active table on the basis of the selection information thus read, and performs VPI conversion on the basis of information stored in the active tables 8-1 and 8-3.

Processing performed when the routing table information and the VPI conversion table are altered will now be described.

When the control unit 9 has received the table alteration instruction 12 for altering the transmission path of the cell from the operator or the control unit which is not illustrated, the control unit 9 selects one routing table and one VPI conversion table other than the active tables out of the above described two routing tables and two VPI conversion tables, and defines them as stand-by tables. In FIG. 1, the routing tables 5-2 and 5-4 and the VPI conversion tables 8-2 and 8-4 are defined as stand-by tables. The control unit 9 then sends the rewriting instruction 14 of stand-by routing table and VPI conversion table to the switch units 21-1 and 21-2 and the output interface units 22-1 and 22-2 to write new information (update information). The control unit 9 then sends the directive signal 13 for selecting the stand-by routing table and VPI conversion table to the input interface units 20-1 and 20-2. In the information adding units 3-1 and 3-2 respectively succeeding the cell storage units 2-1 and 2—2 respectively included in the input interface units 20-1 and 20-2, table selection information (stand-by table selection) is written into an area so disposed within the cell as to store the table selection information. Or the table selection information may be added to the cell.

In the switch units 21-1 and 21-2, each of the AF 4-1 and 4-2 reads table selection information (stand-by table selection) contained in the cell or added to the cell. On the basis of information stored in the stand-by tables 5-2 and 5-4, the ATM switch 6 performs routing.

In the output interface units 22-1 and 22-2, each of the VPI conversion units 7-1 and 7-2 reads table selection information (stand-by table selection) contained in the cell or added to the cell, and performs VPI conversion on the basis of information stored in the stand-by tables 8-2 and 8-4.

By the procedure heretofore described, the routing table and the conversion table are updated without causing interruption.

In case of the above described embodiment, only the VPI conversion has been handled. However, the case of the VCI conversion can also be handled in the same way. In that case, the VPI conversion units 7-1 and 7-2 and the VPI conversion tables 8-1, 8-2, 8-3 and 8-4 of FIG. 1 must be replaced by the VCI conversion units and VCI conversion tables, respectively. Further, the VPI field of the cell shown in FIG. 2 is replaced by a VCI field.

In FIG. 1, the switch unit is so configured as to have only a single stage. As occasion demands, however, the switch unit may have a plurality of stages.

Owing to the present invention, it thus becomes possible to perform switching of routing tables and conversion tables without causing interruption and without performing cell routing in a state of noncoincidence between the referred table and routing requests of the cell.

We claim:

1. A routing method for use in an ATM processing apparatus having a plurality of routing tables each storing routing data for indicating an output port of an ATM switch which transmits an incoming cell and a plurality of conversion tables each storing a virtual path identifier or a virtual channel identifier which is written into said incoming cell after said incoming cell has been routed, said routing method comprising the steps of:

modifying said incoming cell so that said incoming cell comprises selection data specifying one routing table to be selected out of said plurality of routing tables and one conversion table to be selected out of said plurality of conversion tables;

detecting said selection data when said modified cell has arrived at an address filter;

selecting the routing table specified by said detected selection data out of said plurality of routing tables;

routing said modified cell by using said ATM switch on the basis of said selected routing table;

when said routed cell has arrived at a virtual path identifier converter or a virtual channel identifier converter, detecting said selection data out of said routed cell which has arrived;

selecting the conversion table specified by said detected selection data out of said plurality of conversion tables; and rewriting a virtual path identifier or virtual channel identifier stored in said routed cell so as to replace the virtual path identifier or the virtual channel identifier by a virtual path identifier or virtual channel identifier stored in said selected conversion table.

2. A routing method according to claim 1, wherein said modifying step comprises the step of:

writing said selection data into an unoccupied area within said incoming cell.

3. A routing method according to claim 1, wherein said modifying step comprises the step of:

adding said selection data to said incoming cell.

4. A routing method according to claim 1, further comprising, in case said selected routing table and conversion table are to be altered, the steps of:

selecting one routing table and one conversion table other than the currently selected routing table and conversion table out of said plurality of routing tables and said plurality of conversion tables;

writing new information into said selected one routing table and one conversion table, respectively; and modifying said incoming cell so that said incoming cell comprises selection data indicating selection of said one routing table and one conversion table.

5. A routing method according to claim 4, wherein said modifying step comprises the step of:

writing said selection data into an unoccupied area within said incoming cell.

6. A routing method according to claim 4, wherein said modifying step comprises the step of:

adding said selection data to said incoming cell.

7. A routing method for use in an ATM processing apparatus having a plurality of routing tables each storing routing data for indicating an output port of an ATM switch which transmits an incoming cell, said routing method comprising the steps of:

modifying said incoming cell so that said incoming cell comprises selection data specifying one routing table to be selected out of said plurality of routing tables;

detecting said selection data when said modified cell has arrived at an address filter;

selecting a routing table specified by said detected selection data out of said plurality of routing tables; and routing said cell by using said ATM switch on the basis of said selected routing table.

8. A routing method according to claim 7, wherein said modifying step comprises the step of:

writing said selection data into an unoccupied area within said incoming cell.

9. A routing method according to claim 7, wherein said modifying step comprises the step of:

adding said selection data to said incoming cell.

10. A routing method according to claim 7, further comprising, in case said selected routing table is to be altered, the steps of:

selecting one routing table other than the currently selected routing table out of said plurality of routing tables;

writing new information into said selected one routing table; and modifying said incoming cell so that said incoming cell comprises selection data indicating selection of said one routing table.

11. A routing method according to claim 10, wherein said modifying step comprises the step of:

writing said selection data into an unoccupied area within said incoming cell.

12. A routing method according to claim 10, wherein said modifying step comprises the step of:

adding said selection data to said incoming cell.

13. An ATM processing apparatus comprising:

an input interface unit having a plurality of inputs to be connected to a plurality of input highways and having a plurality of outputs;

a switch unit including an ATM switch, said ATM switch having a plurality of input ports and a plurality of output ports, said input ports being connected to said outputs of said input interface unit;

an output interface unit having a plurality of inputs connected to said output ports of said ATM switch and having a plurality of outputs to be connected to a plurality of output highways;

a control unit connected to said input interface unit, and said output interface unit;

a plurality of address filters respectively connected between said outputs of said input interface unit and the input ports of said ATM switch, said address filters each selecting routing data indicating an output port of said ATM switch which transmits an incoming cell fed from said input interface unit;

a plurality of routing tables connected to the address filters, said routing tables storing respectively different routing data;

each of said address filters including means for detecting table selection data contained in said incoming cell and for selecting one routing table out of said plurality of routing tables on the basis of table selection data thus detected, said ATM switch routing said incoming cell on the basis of routing data stored in said selected routing table;

said output interface unit including a plurality of conversion means respectively connected between said output ports of said ATM switch and said output highways, said conversion means selecting data for specifying a virtual path identifier or a virtual channel identifier of an outgoing cell fed from an associated output port and writing the specified identifier into said outgoing cell;

a plurality of conversion tables connected to conversion means, said conversion tables storing respectively different virtual path identifier data or virtual channel identifier data;

each of said conversion means including means for detecting said table selection data contained in an outgoing cell fed from an associated output port and for selecting one conversion table out of said plurality of conversion tables on the basis of the table selection data thus detected, each of said conversion means writing the virtual path identifier or virtual channel identifier stored in the selected conversion table into said outgoing cell; and said input interface unit including means responsive to said control means, for modifying an incoming cell fed from each input highway so that said incoming cell contains said table selection data.

14. An ATM processing apparatus according to claim 13, wherein said incoming cell modifying means comprises means for writing said table selection data into an unoccupied area within said incoming cell.

15. An ATM processing apparatus according to claim 13, wherein said modifying means comprises means for adding said table selection data to said incoming cell.

16. An ATM processing apparatus comprising:

an ATM switch having a plurality of input ports each connected to one of a plurality of input highways and a plurality of output ports;

a plurality of address filters respectively connected to said plurality of input ports, each of said plurality of address filters selecting routing data indicating an output port for transmitting an incoming cell inputted to an associated input port;

a plurality of routing tables connected to each of the address filters, said routing tables storing said routing data;

a plurality of adding circuits, each connected to one of said input highways, for adding to each incoming cell input to an associated input highway table selection data which indicates which one of the routing tables connected to an associated address filter is to be selected; and each of said address filters including means for detecting table selection data contained in an associated incoming cell and for selecting one routing table out of said plurality of routing tables on the basis of said detected table selection data, said ATM switch routing said incoming cell on the basis of routing information stored in said selected routing table.

* * * * *